United States Patent
Banks

(10) Patent No.: US 11,225,621 B2
(45) Date of Patent: Jan. 18, 2022

(54) DEEP VACUUM REGENERATION OF ADSORBENT MEDIA

(71) Applicant: Compression Leasing Services, Inc., Casper, WY (US)

(72) Inventor: Jeremy C. Banks, Casper, WY (US)

(73) Assignee: Compression Leasing Services, Inc., Casper, WY (US)

( * ) Notice: Subject to any disclaimer, the term of this patent is extended or adjusted under 35 U.S.C. 154(b) by 156 days.

(21) Appl. No.: 16/491,434

(22) PCT Filed: Mar. 8, 2018

(86) PCT No.: PCT/US2018/021590
§ 371 (c)(1),
(2) Date: Sep. 5, 2019

(87) PCT Pub. No.: WO2018/165458
PCT Pub. Date: Sep. 13, 2018

(65) Prior Publication Data
US 2020/0032154 A1 Jan. 30, 2020

Related U.S. Application Data

(60) Provisional application No. 62/469,578, filed on Mar. 10, 2017.

(51) Int. Cl.
*B01D 53/00* (2006.01)
*C10L 3/10* (2006.01)
(Continued)

(52) U.S. Cl.
CPC .......... *C10L 3/106* (2013.01); *B01D 53/0476* (2013.01); *B01D 53/261* (2013.01);
(Continued)

(58) Field of Classification Search
CPC ............ B01D 53/261; B01D 2256/245; B01D 2257/304; B01D 2257/504;
(Continued)

(56) References Cited

U.S. PATENT DOCUMENTS 3,206,918 A 9/1965 Robinson
3,349,544 A 10/1967 Arnold et al.
(Continued)

FOREIGN PATENT DOCUMENTS

CN 104061634 9/2014
GB 1150346 * 4/1969
(Continued)

OTHER PUBLICATIONS

PCT/US18/21590, International Search Report and Written Opinion, dated Jun. 27, 2018.

*Primary Examiner* — Sharon Pregler
(74) *Attorney, Agent, or Firm* — Weatherly IP Solutions, LLC; James Weatherly

(57) ABSTRACT

Embodiments of the present disclosure provide systems, apparatuses and methods for the use of deep vacuum for the regeneration of desiccant in compressed gas desiccant dryers. Through the use of a vacuum pump operably coupled to a gas dryer, the systems and methods described herein allow for a gas dryer system to reach a deep vacuum pressure, inducing liquid within the desiccant in a gas dryer tower to reach a boiling point induced by the low pressure and lower boiling point of water or liquid, allowing the water or liquid to change from a liquid to a gas. This phase change allows the liquid to separate from the desiccant. The vacuum pump is then able to remove or pull the vapor that has been released from the desiccant from the system.

49 Claims, 7 Drawing Sheets

(51) Int. Cl.
  *B01D 53/047* (2006.01)
  *B01D 53/26* (2006.01)
(52) U.S. Cl.
  CPC .. *B01D 2256/245* (2013.01); *B01D 2257/304* (2013.01); *B01D 2257/504* (2013.01); *B01D 2259/402* (2013.01); *C10L 2290/06* (2013.01); *C10L 2290/12* (2013.01); *C10L 2290/542* (2013.01)
(58) Field of Classification Search
  CPC .......... B01D 2259/402; B01D 53/0476; C10L 3/106; C10L 2290/06; C10L 2290/12; C10L 2290/542
  See application file for complete search history.

(56) References Cited

U.S. PATENT DOCUMENTS

| | | | |
|---|---|---|---|
| 4,009,083 | A | 2/1977 | Lyon et al. |
| 4,127,395 | A | 11/1978 | McKey |
| 4,312,641 | A | 1/1982 | Verrando |
| 4,351,732 | A | 9/1982 | Psaras |
| 4,783,432 | A | 11/1988 | Settlemyer |
| 4,891,051 | A | 1/1990 | Frantz |
| 5,501,776 | A | 3/1996 | Lermite et al. |
| 5,846,294 | A | 12/1998 | Doong |
| 6,238,461 | B1 | 5/2001 | Heath |
| 8,894,754 | B2 | 11/2014 | Menard et al. |
| 2011/0041537 | A1 | 2/2011 | Pun |

FOREIGN PATENT DOCUMENTS

| | | |
|---|---|---|
| JP | 2011242117 | 12/2011 |
| JP | 2012145247 | 8/2012 |
| JP | 20151177560 | 10/2015 |
| KR | 2016128241 | 11/2016 |
| WO | 1999014538 | 3/1999 |
| WO | 2015179884 | 11/2015 |

* cited by examiner

DEEP VACUUM REGENERATION OF ADSORBENT MEDIA

CROSS REFERENCE TO RELATED APPLICATIONS

The present application claims priority to U.S. Provisional Application No. 62/469,578, as filed on Mar. 10, 2017, and Patent Cooperation Treaty Application No. PCT/US18/21590, as filed on Mar. 8, 2018, the entire contents of both are herein incorporated by reference for all they teach and disclose.

BACKGROUND

Various forms of compressed gas are widely used around the world for a number of industries. The presence of water vapor in compressed gas is often an unwanted constituent that can result in an array of problems or unwanted characteristics. Various methods exist to dry the gas in a compressed gas system. One such method uses an adsorption process where an adsorbent material or desiccant is used to adsorb water vapor from the compressed gas. The desiccant, once saturated with water, must then be dried or regenerated so that it can be reused. There are three common methods for the regeneration of desiccant, the first is the use of heatless "pressure-swing" drying. This method, in a two-tower system, uses part of the dry compressed air from a second tower in the system to dry the desiccant in a first tower. The second method is the use of a heated dryer. This method uses hot air from a blower to dry the air. The third and final method is the use of heat of compression.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope.

An embodiment of the present invention comprises a system for regeneration of desiccant in a compressed gas drying tower, the system comprising: at least one first drying tower and at least one second drying tower, where each of the at least one first drying tower and at least one second drying tower contain desiccant for the removal of water from compressed gas; a series of valves, including but not limited to, at least one first pressure inlet valve and at least one second pressure inlet valve; where the at least one first drying tower is operably connected to the first pressure inlet valve, and where the at least one first pressure inlet valve regulates the movement of compressed gas from the inlet valve to the at least one first drying tower; and where the at least one second drying tower is operably connected to the second pressure inlet valve, and where the at least one second pressure inlet valve regulates the movement of compressed gas from the inlet valve to the at least one second drying tower; at least one first pressure outlet valve, and at least one second pressure outlet valve; where the at least one first pressure outlet valve regulates the movement of compressed gas out of the at least one first drying tower and out of the system; and where the at least one second pressure outlet valve regulates the movement of compressed gas out of the at least one second drying tower and out of the system; at least one vacuum pump, where the vacuum pump is operably coupled to the at least one first drying tower and operably coupled to the at least one second drying tower; and at least one first vacuum pressure valve operably coupled to the at least one first drying tower and the vacuum; and at least one second vacuum pressure valve is operably coupled to the at least one second drying tower and the vacuum; where the at least one first vacuum pressure valve controls the pressure between the vacuum and the first drying tower; and where the at least one second vacuum pressure valve controls the pressure between the vacuum and the second drying tower.

An embodiment of the present invention comprises a method for regeneration of desiccant in a compressed gas drying tower, the method comprising: providing a desiccant regeneration system comprising: providing at least one first drying tower and at least one second drying tower, where each of the at least one first drying tower and at least one second drying tower contain desiccant for the removal of water from compressed gas; providing at least one first pressure inlet valve and at least one second pressure inlet valve; where the at least one first drying tower is operably connected to the inlet valve, and where the at least one first pressure inlet valve regulates the movement of compressed gas from the inlet valve to the at least one first drying tower; and where the at least one second drying tower is operably connected to the inlet valve, and where the at least one second pressure inlet valve regulates the movement of compressed gas from the inlet valve to the at least one second drying tower; providing at least one first pressure outlet valve, and at least one second pressure outlet valve; where at least one first pressure outlet valve regulates the movement of compressed gas out of the at least one first drying tower and out of the system; and where the at least one second pressure outlet valve regulates the movement of compressed gas out of the at least one first drying tower and out of the system; providing a vacuum pump, where the vacuum is operably coupled to the at least one first drying tower and operably coupled to the at least one second drying tower; and providing at least one first vacuum pressure valve operably coupled to the at least one first drying tower and the vacuum; and providing at least one second vacuum pressure valve operably coupled to the at least one second drying tower and the vacuum; where the at least one first vacuum pressure valve controls the pressure between the vacuum and the first drying tower; and where the at least one second vacuum pressure valve controls the pressure between the vacuum and the second drying tower; creating a sealed connection between the vacuum pump and one of the drying towers by closing the first pressure inlet valve or the second pressure inlet valve and closing either the first vacuum valve or the second vacuum valve to match the closure of the first pressure outlet valve or the second pressure outlet valve; causing the vacuum pump to create a deep vacuum in the sealed connection between the vacuum and the drying tower where one of the pressure inlet valves, one of the pressure outlet valves, and one of the vacuum valves have been sealed; inducing liquid within the desiccant in the sealed drying tower in the deep vacuum to reach a boiling point induced by the deep vacuum or low pressure and lower boiling point of water or liquid, allowing the water or liquid to change from a liquid to a gas; where the water or generated gas is removed from the system through the vacuum outlet; and where the desiccant is regenerated within the drying tower.

An embodiment of the present invention comprises a desiccant regeneration system, the system comprising: a series of drying towers, where each of the drying towers contains desiccant for drying sour gas, where the number of drying towers is relative to the number of components within the sour gas; a vacuum pump operably coupled to the series of towers; and a series of valves that allow for the system to isolate one or more towers for the regeneration of desiccant.

An embodiment of the present invention comprises a method for regeneration of desiccant is a series of drying towers, the method comprising: providing a series of drying towers, where each of the drying towers contains desiccant for drying sour gas, where the number of drying tower is relative to the number of components within the sour gas; providing a vacuum pump operably coupled to the series of towers; and providing a series of valves that allow for the system to isolate one or more towers for the regeneration of desiccant; initiating a regeneration sequence, where the initiation comprises: isolating an individual drying tower within the series of drying towers; where the isolation of the individual drying tower is through the closing of individual valves in the system, where the individual valves are chosen from: the at least one first inlet pressure valve and the at least one second inlet pressure valve; the at least one first pressure outlet valve and the at least one second pressure outlet valve; and the at least one first vacuum pressure valve and the at least one second vacuum pressure valve; causing the vacuum pump to create a deep vacuum in the open connection between the vacuum and the tower in a regeneration sequence; and inducing liquid within the desiccant in the tower in a regeneration sequence to reach a boiling point induced by the deep vacuum and change to a gas state; where the gas is removed from the system through the vacuum outlet; and where the desiccant is regenerated within the drying tower in a regeneration sequence.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Embodiments of the present disclosure provide systems, apparatuses and methods for the use of deep vacuum for the regeneration of desiccant in compressed gas desiccant dryers. Through the use of a vacuum pump operably coupled to a gas dryer system, such as a two-tower dryer system, the systems and methods described herein allow for a gas dryer system to reach a deep vacuum pressure within one or more dryer towers, inducing liquid within the desiccant in a gas dryer tower to reach a boiling point, induced by the low pressure and lower or reduced boiling point of water or liquid, allowing the water or liquid to change from a liquid to a gas. This phase change allows the liquid to separate from the desiccant, allowing the desiccant to dry or regenerate. The vacuum pump is then able to remove or pull the vapor that has been released from the desiccant from the system.

Figure 1:
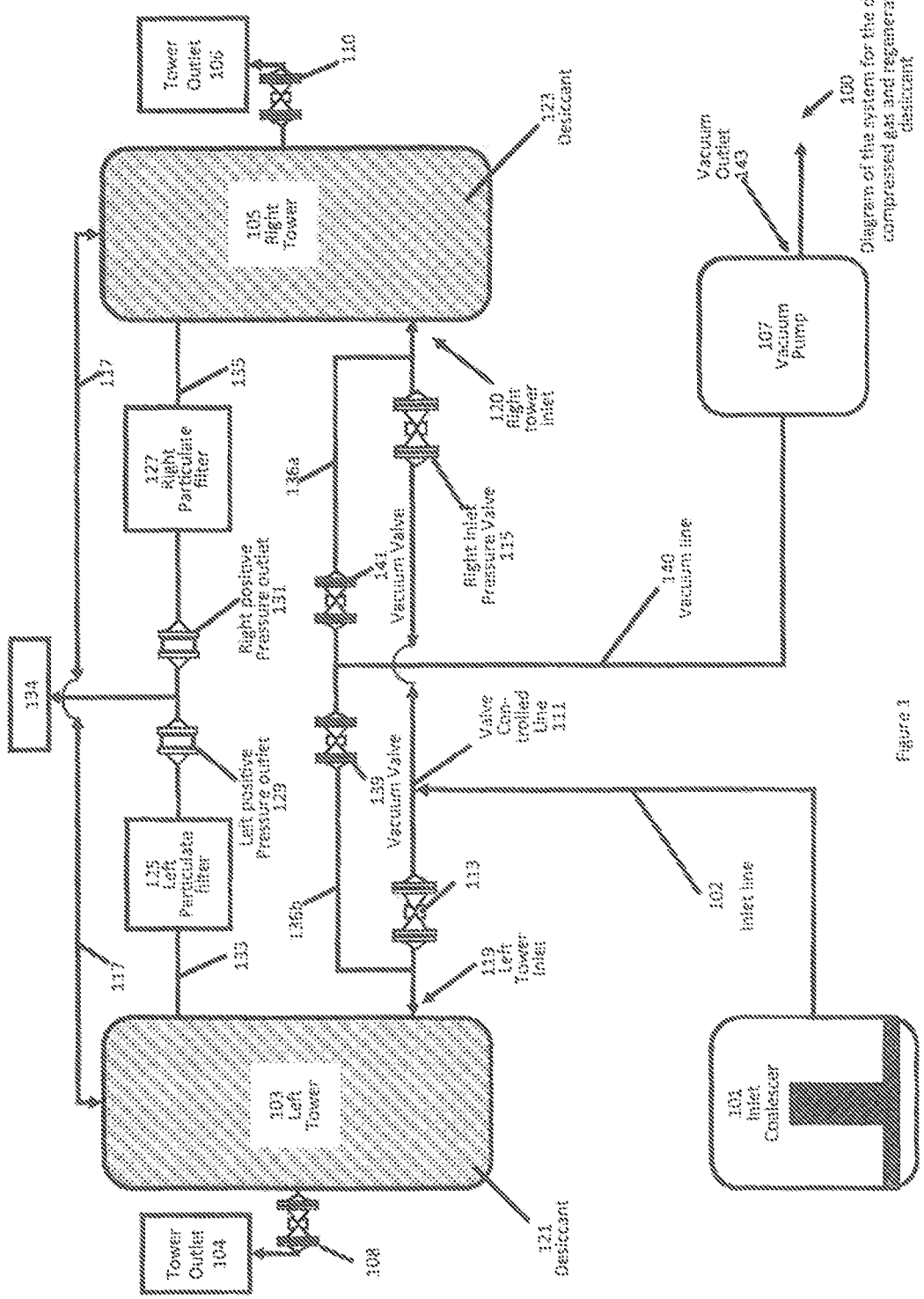
FIG. 1 shows an overall diagram of the system of the present disclosure for the drying and cleaning of pressurized gas and regeneration of desiccant in a drying tower.

FIG. 1 shows an overall diagram of the system of the present disclosure for the drying and regeneration of compressed or pressurized gas 100. As shown in FIG. 1, an inlet coalescer 101 is operably coupled to a gas drying and regeneration system 100, where the gas drying and regeneration system 100 comprises at least two drying towers, a left tower 103 and a right tower 105, where both drying towers contain desiccant 121 and 123. Also, shown in FIG. 1 are an inlet line 102, a valve controlled line 111, a left inlet pressure valve 113 and a right inlet pressure valve 115, a left tower inlet 119 and a right tower inlet 120, a right tower outlet line 135 and a left tower outlet line 133, a left tower particulate filter 125 and a right tower particulate filter 127, two positive pressure outlets or check valves 129 and 131, a sweep gas line 117, a system outlet 134, a left tower outlet 104, a left tower outlet valve 108, a right tower outlet 106, a right tower outlet valve 110, two vacuum valves 139 and 141, two vacuum valve lines 136a and 136b, a vacuum pump 107, a vacuum line 140, and a vacuum outlet 143.

As shown in FIG. 1, a valve-controlled line 111, a left inlet pressure valve 113 and a right inlet pressure valve 115 operably couple the left tower 103 and a right tower 105, allowing compressed gas from the inlet coalescer 101 to travel by means of an inlet line 102 to either tower 103 and 105 based on the open and closed positions of the left inlet pressure valve 113 and the right inlet pressure valve 115.

For drying of gas, using the left tower 103 in FIG. 1 as an example, as the pressurized or compressed gas travels through the inlet line 102 and through the valve-controlled line 111, the right inlet pressure valve 115 is closed and the left inlet pressure valve 113 is open, forcing the gas to flow into the left tower 103, through the left tower inlet 119. The compressed gas upon entering the tower 103 will have a minimal amount of oil and liquid but may be fully saturated. Please note that in FIG. 1, two vacuum valves 139 and 141 and two vacuum valve lines 136a and 136b are shown with the vacuum line 136a operably coupled to the line coupling the left tower inlet 119 to the left inlet pressure valve 113. In a drying sequence on the left tower 103, the left vacuum valve 139 will be in a closed state.

Each of the dryer towers 103 and 105 shown in FIG. 1 contain a bed of desiccant for drying the compressed gas, such as aluminum oxide desiccant 121 and 123. The desiccant is used to adsorb undesired constituents within the pressurized or compressed gas, including but not limited to water, natural gas liquids, $CO_2$ and $H_2S$. As the compressed gas enters a drying tower and impacts the desiccant 121 and 123, a phase change occurs and the desiccant 121 and 123 holds the liquid water on its surface area using Van Der Waals forces and capillary condensation. Based on the adsorption by the desiccant 121 or 123 in the left tower 103 or the right tower 105, the compressed gas will have been cleaned or dried, by way of example, to between 0.3 and 0.6 microns and now has a pressure dew point between positive 40 pressure dew point (PDP) or −40 PDP, please note that a number of dew point values may be used in the invention, as will be understood by one skilled in the art. Also, as will be discussed later in this document, cones or diffusion screens may also be placed in the dryer towers 103 and 105 to increase the adsorption efficiency of the desiccant.

A number of dry or gel desiccants 121 and 123 may be used in the drying towers, as will be understood by one skilled in the art once they understand the systems and methods described herein. Examples of desiccants that may be used with the systems and methods described herein, include but are not limited to, aluminum oxide, aluminum hydroxide, activated alumina, silica, silica gel, indicating silica gel, silica dioxide, charcoal, activated charcoal, activated carbon, calcium sulfate, calcium chloride, calcium oxide, magnesium aluminum silicate, clay, montmorillonite clay, molecular sieves, and other adsorbents.

Once the compressed gas has been dried by the desiccant, the pressurized or compressed gas travels out the drying tower 103 through a line 133 that operably connects the left tower 103 to one or more particulate filters, shown in FIG. 1 as the left tower particulate filter 125. In the left particulate filter 125, any remaining bulk pieces of desiccant 121 or broken desiccant larger than 1 micron in size are filtered out of the compressed gas.

The particulate filters 125 and 127 are integrated into the system of FIG. 1 in order to protect the various equipment within the system 100. The particulate filters are designed to catch any broken desiccant or other particles greater than one (1) micron in size. While two particulate filters are shown in the system 100 of FIG. 1, any number of particulate filters may be used with-in the system described as will become apparent to those skilled in the art upon a reading of the specification and a study of the drawings. Please note that while one (1) micron size is described in this example, a number of filter sizes may be used with this system pending the requirements of the compressed gas or other system components, as will be understood by those skilled in the art upon a reading of the specification and a study of the drawings.

The cleaned and dried compressed gas now travels from the left particulate filter 125, through a left positive pressure outlet or check valve 129 that allows compressed gas to flow through the valve in only one direction, from the filter to the system outlet. The compressed gas is evacuated out of the system through the system outlet 134. The compressed gas may now be used for various applications. Please note that while two positive pressure outlets or check valves 129 or 131 are shown in FIG. 1, two or more positive pressure outlets or check valves are contemplated in this disclosure based upon the needs of the compressed gas and the system, as will be understood by those skilled in the art upon a reading of the specification and a study of the drawings.

As shown in FIG. 1, system 100 is capable of constantly switching between the left tower 103 and right tower 105 to dry compressed gas. As one side of the system 100 is in use for drying of compressed gas, the other side of the system 100 may enter a regeneration sequence to regenerate desiccant 121 and 123 in the opposite associated tower 103 and 105. Please note that a valve, such as a 3-way valve (shown in FIG. 7 as 112) may be used in the system of FIG. 1: (1) as a purge valve for a heatless regenerative dryer and (2) as a re-pressurization valve for switching towers and the re-pressurization of a drying tower. The entire system 100 is designed to limit potential vacuum leaks. All piping may be welded with flanges and gaskets, with welds shown in the example system in FIG. 7 as black dots.

A number of gases, being the physical state of the substance, may be applied to the system and methods described herein, including, but not limited to, air, natural gas, propane, methane, butane, pentane, acetylene as well as other forms of alkanes, alkenes, alkynes, cycloalkanes, and alkadienes, oxygen, nitrogen, chlorine, fluorine, and hydrogen as well as noble gases, such as helium, neon, argon, krypton, nitrogen, xenon, and radon.

Figure 2:
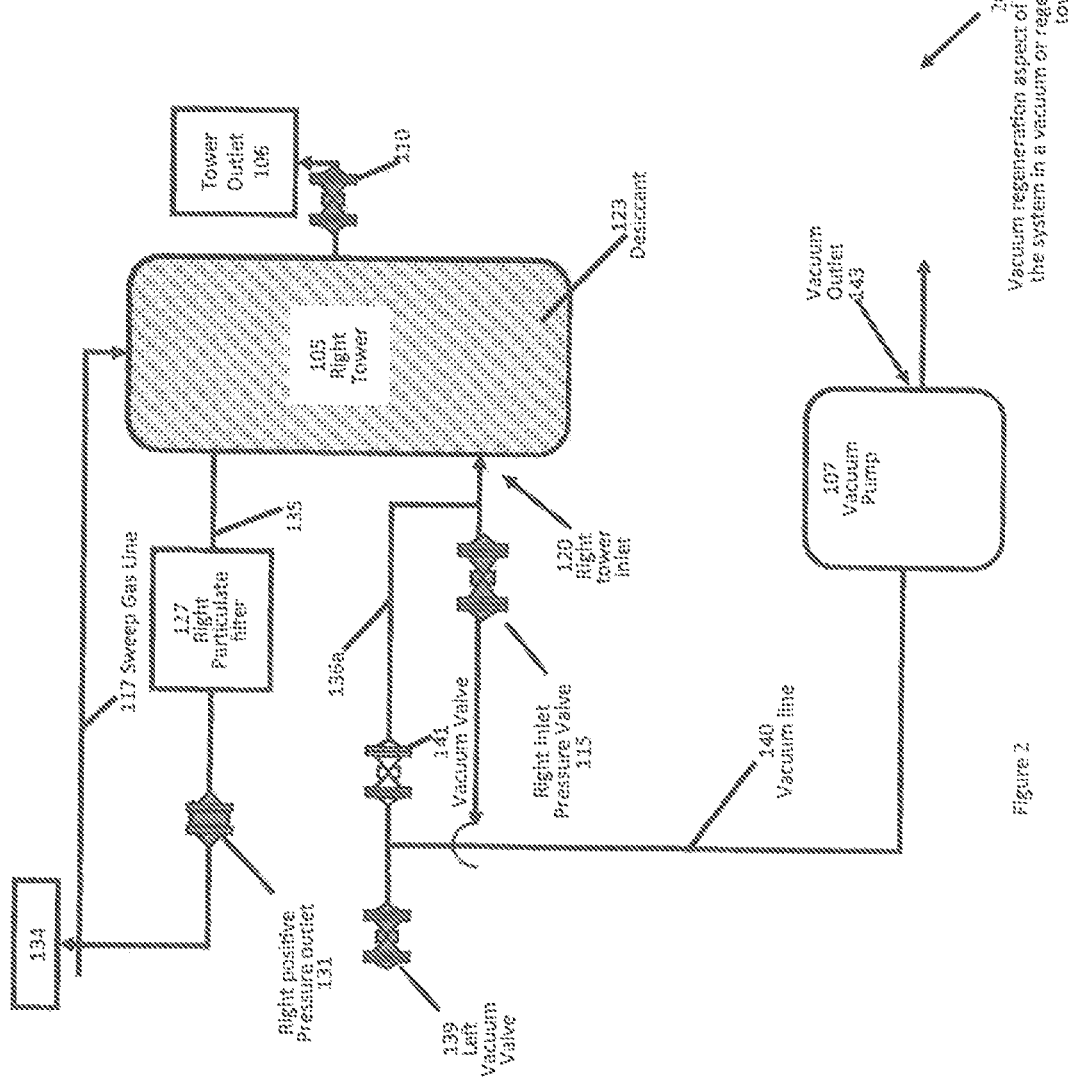
FIG. 2 shows the vacuum regeneration aspect of the system 100 of FIG. 1, with the system in a vacuum or regeneration sequence on the right tower.

FIG. 2 shows the system of FIG. 1 in a vacuum or regeneration sequence on the right tower 105, 200. As shown in FIG. 2, a vacuum pump 107 is operably coupled to the system 100 by means of a vacuum line 140. In FIG. 2, the right side of the system 100 is shown in the vacuum or regeneration sequence, allowing for regeneration of the desiccant 123 in the right tower 105. The right inlet pressure valve 115 and the left vacuum valve 139 are closed (closed valves are shown in grey), while the right positive pressure outlet valve 131 prevents flow from the system outlet 134 back towards the components involved in regeneration.

Please note that in the example shown in FIG. 2, the right tower outlet valve 110 remains closed in both drying and regeneration sequences of operation and is only open for de-pressurization of the right tower 105. The closing of the right inlet pressure valve 115, the left vacuum valve 139, and the right pressure or check valve 131, while the right vacuum valve 141 is open, creates a completely sealed and enclosed system between the vacuum pump 107 and the right tower 105, allowing the vacuum pump 107 to begin to create a deep vacuum (between 20.72 and 29.90 inHg) in the lines 140, 135 and 136a and right tower 105.

This deep vacuum creates a drop in the required temperature for the phase change point of the gas, inducing liquid within the desiccant in a tower to reach a boiling point. The liquid contained on the surface of the desiccant 123 will have a certain vapor pressure depending on the properties of the substance. Once the vacuum pressure in the lines 140, 135 and 136a and right tower 105 is equal or less than the vapor pressure of the liquid constituent, the liquid will undergo a phase change, causing the liquid to boil and change to a vapor. As liquid changes phase to a gas, the phase change will break the forces of adsorption binding the liquid to the desiccant 123, and the gas will start flowing due to a pressure drop across the system 200.

The pressure in the tower 105 will be greater than the pressure in the vacuum pump 107 ultimately leading to the gas vapor flowing out of the system 100 through the vacuum pump 107. The deep vacuum pressure within the system will help to inhibit the desiccant 123 from re-adsorbing the gas due to the decreased vapor pressure of the gas which decreases the probability that the gas can be adsorbed. Also, the direction by which vacuum pump 107 is applying vacuum pressure will help inhibit the desiccant 123 from re-adsorbing the gas because the gas will flow from less saturated desiccant past more saturated desiccant, and the more the desiccant is saturated, the lower the probability of the gas being adsorbed. At the vacuum outlet, 143, the vapor can be directed to the atmosphere or a tank to capture unwanted vapors. The vapors can also be distilled back into a liquid for easier transferring, separation, and storage of the un-desired substance in the pressurized gas flow. Once the desiccant has been regenerated and the vapor removed from the system of FIG. 2, the system is re-pressurized prior to allowing compressed gas back into the system, as will be discussed in further detail in relation to FIG. 7.

In another embodiment, a pneumatic pressurized gas line or sweep gas line 117 operably coupling the right tower 105 to the left tower 103 (or connecting the right tower 105 and left tower 103 to the outlet 134, not shown in FIG. 1.) may be used to allow compressed gas from the drying tower (in this example the left tower 103) to be "leaked" into the right tower 105 as a sweep or purge gas to assist in the regeneration of the desiccant 123.

Sweep gas is gas that is at system pressure, and is composed of any gas that is the working fluid of the system 100. The sweep gas originates from either drying vessel (in FIG. 2, the left tower 103) or the system outlet 134 and leaked into either regenerating tower (in FIG. 2, the right tower 105) during the regeneration sequence while the regeneration tower 105 is in deep vacuum. The gas is forced through the pneumatic pressurized gas line 117 in the same direction the vacuum pump 107 is pulling on the tower during regeneration. This small leak slightly raises the internal pressure of the tank 105 during regeneration. The higher the temperature in the desiccant 123, the higher the sweep gas flowrate can be. This is because less vacuum pressure is required to boil the liquid.

In another embodiment of the present disclosure, the sweep gas may be pulsed through the sweep gas line 117 to the regenerating tank in a regeneration sequence. In this embodiment, the pulsing of sweep gas allows the system 100 to pulsate the pressure in the regeneration tank 103 or 105. This is accomplished by allowing the regeneration tank to reach full vacuum pressure (or deep vacuum) and then turning on the sweep gas at a high-volume rate. Once the pressure in the regeneration tank rises to a specified point, the sweep gas is turned off and the system is allowed to return to full vacuum. The cycle is then repeated.

The sweep gas is at system pressure, and is composed of any gas that is the working fluid of the system. The sweep gas comes from the dry side of the drying tower (or the system outlet) and a small amount of gas is leaked into the other tower (regenerating tower) while the tower is in deep vacuum.

In this example, as the sweep gas is introduced into the regeneration tower 105, the gas volume expands, with the ultimate function to create a pressure drop between the tower 105 and the vacuum pump 107 to push vapor away from the desiccant material 123 in the tower 105 undergoing regeneration and out of the system 100 through the vacuum outlet 143. Please note that too much sweep gas in the system will increase the pressure in a regeneration tower (because the vacuum pump cannot accommodate the higher flow) to the point where liquid is not able to change phase by boiling, due to the vapor pressure not being greater than the pressure in the regeneration towers.

In the example provided in FIG. 2, a rotary pump or positive displacement pump is shown as the vacuum pump 107, such as the Quincy QSV 530 high water capacity pump (Quincy Compressors, Bay Minnette, Ala.). As will be understood by one skilled in the art, a number of different pumps may be used in the systems provided herein provided they reach a particular high vacuum pressure and maintain a particular volume flow rate at that pressure (mass flow rate). The pressure requirements for the systems and methods herein will need to be around 20 inHg to 29.9 inHg vacuum relative to sea level.

Figure 3:
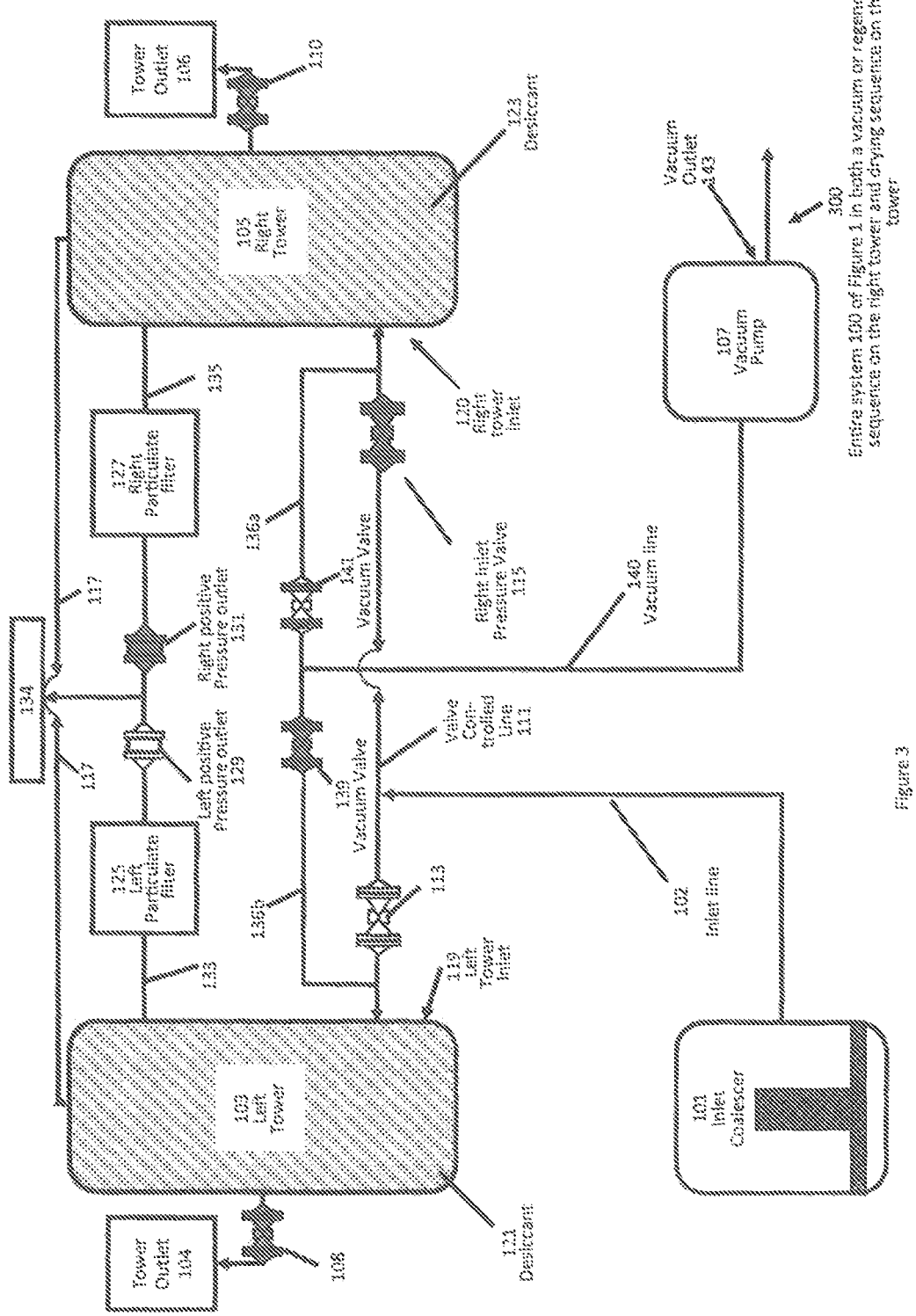
FIG. 3 shows a diagram of the system of the present disclosure with the right tower in a regeneration sequence and the left tower in a drying sequence.

FIG. 3 shows the entire system 100 of FIG. 1 in both a vacuum or regeneration sequence on the right tower 105 and drying sequence on the left tower 103, 300. As shown in FIG. 3 and previously shown in FIG. 2, a vacuum pump 107 is operably coupled to the system 100 by means of a vacuum line 140. In FIG. 3, the right side of the system 100 is in the vacuum or regeneration sequence, allowing for regeneration of the desiccant 123 in the right tower 105, while at the same time, the left side of the system 100 is drying compressed gas in the left tower 103. As discussed above, the right inlet valve 115 is closed, the right vacuum valve 141 is open and the left vacuum valve 139 is closed (shown with the valves in grey as closed), while the right pressure outlet valve 131 is closed and prevents flow from the system outlet 134 back towards the components involved in regeneration, creating a completely sealed and enclosed system between the vacuum pump 107 and the right tower 105. This seal allows the vacuum pump 107, once initiated, to begin to create a deep vacuum in the lines 140, 135 and 136a and right tower 105 as well as in the right inlet 120 and the right particulate filter 127. However, as discussed in FIG. 2, a pneumatic pressurized gas line 117 operably couples the right tower 105 to the left tower 103 or the right tower 105 and the left tower 103 to the system outlet 134 and may also be used in order to allow a small amount of compressed gas from the drying tower (in this example the left tower 103) to leak into the right tower 105 as a sweep or purge gas. This input of gas slightly raises the internal pressure of the regeneration tank 105, assisting in creating a pressure drop from the regeneration tank 105 to the vacuum pump 107 that will drive the vapor from the tower 105 to the vacuum pump 107.

This deep vacuum in the right tower 105 and subsequent lines 135, 136a and 140 as well as in the right inlet 120 and the right particulate filter 127, creates a drop in the required temperature for the phase change point of the gas, inducing liquid within the desiccant in a tower to reach a boiling point. The liquid contained on the surface of the desiccant 123 in the right tower 105 will have a certain vapor pressure depending on the properties of the substance. Once the vacuum pressure in the lines 140, 135 and 136 and right tower 105 is equal or less than the vapor pressure of the liquid constituent, the liquid will undergo a phase change, causing the liquid to boil and change to a vapor. As liquid changes phase to a gas, the phase change will break the forces of adsorption binding the liquid to the desiccant 123 in the right tower 105. If sweep gas is provided, the sweep gas that has been introduced into the regeneration tower 105, expands in volume, and will begin to carry or push vapor away from the desiccant material 123 in the tower 105 undergoing regeneration and out of the system 100 through the vacuum outlet 143. As discussed previously, the pressure in the right tower 105 will be greater than the pressure in the vacuum pump 107 ultimately leading to the gas vapor flowing out of the system 100 through the vacuum pump 107. The deep vacuum pressure within the system will help to inhibit the desiccant 123 from re-adsorbing the gas due to the decreased vapor pressure of the gas which decreases the probability that the gas can be adsorbed. Also, the direction by which vacuum pump 107 is applying vacuum pressure will help inhibit the desiccant 123 from re-adsorbing the gas because the gas will flow from less saturated desiccant past more saturated desiccant, and the more the desiccant is saturated, the lower the probability of the gas being adsorbed. At the vacuum outlet, 143, the vapor can be directed to the atmosphere or a tank to capture unwanted vapors. The vapors can also be distilled back into a liquid for easier transferring, separation, and storage of the un-desired substance in the pressurized gas flow. Once the desiccant has been regenerated and the vapor removed from the system of FIG. 3, the system is re-pressurized prior to allowing compressed gas back into the system.

Figure 4:
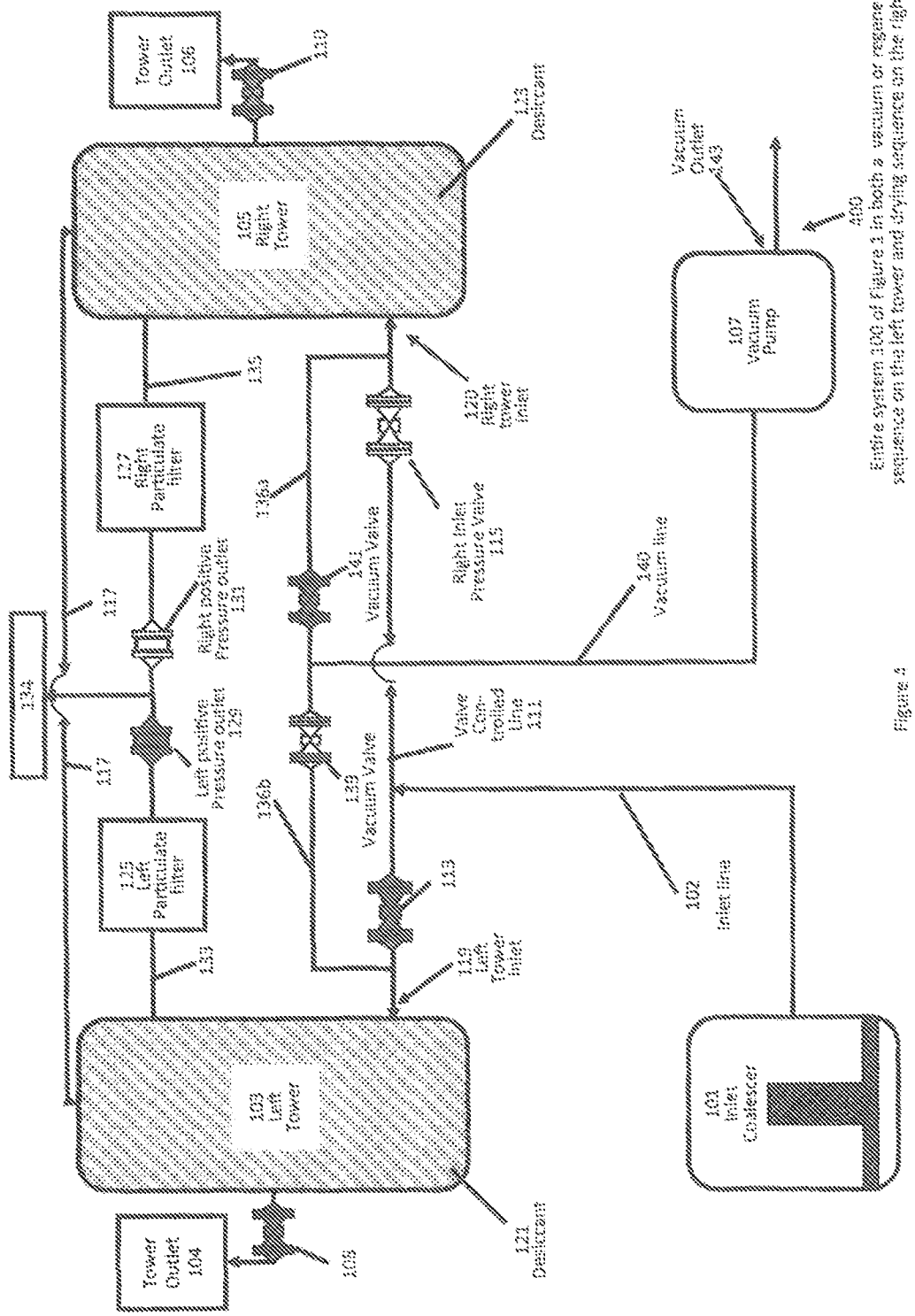
FIG. 4 shows a diagram of the system of the present disclosure with the left tower in a regeneration sequence and the right tower in a drying sequence.

FIG. 4 shows the entire system 100 of FIG. 1 in both a vacuum or regeneration sequence on the left tower 103 and drying sequence on the right tower 105, 400. As shown in FIG. 4 and previously shown in FIGS. 2 and 3, a vacuum pump 107 is operably coupled to the system 100 by means of a vacuum line 140. In FIG. 4, the left side of the system 100 is in the vacuum or regeneration sequence, allowing for regeneration of the desiccant 121 in the left tower 103. The left inlet valve 113 and the right vacuum valve 141 are closed (shown in grey) with the left vacuum valve 139 open, while the closed left positive pressure outlet valve 129 prevents flow from the system outlet 134 back towards the components involved in regeneration, creating an enclosed system between the vacuum pump 107 and the left tower 103, allowing the vacuum pump 107 to begin to create a deep vacuum in the lines 140, 133 and 136b and left tower 103 as well as in the particulate filter 125 and left tower inlet 119. Please note that in this example a sweep gas line 117 is provided, operably coupling the left tower 103 and the right tower 105 or the left tower 103 and the right tower 105 to the system outlet 134, and as previously discussed, allowing sweep gas to be either leaked or pulsed from the drying tower 105 to the regeneration tower 103.

As previously discussed, once the system goes into a vacuum stage on the left tower, 103, the vacuum pump 107 will reduce the pressure in the left tower 103 and the lines on the left side of the system (140, 133 and 136b) as well as in the particulate filter 125 and left tower inlet 119. Once the vacuum pressure in the lines 140, 136b and 133 and left tower 103 is equal or less than the vapor pressure of the liquid constituent (between 20 inHg vacuum to 29.9 inHg vacuum relative to sea level, temperature dependent), the liquid will undergo a phase change, causing the liquid to boil and change to a vapor. As liquid changes phase to a gas, the liquid phase change will break the forces of adsorption binding the liquid to the desiccant 121 in the left tower 103, and the gas will start flowing due to a pressure drop across the system. The pressure in the left tower 103 will be greater than the pressure in the vacuum pump 107, ultimately leading to the gas vapor flowing out of the system 100 through the vacuum pump 107. If sweep gas is added to the left tower 103, the expansion of the sweep gas in the vacuum state will aid in moving the vapor out of the system. At the vacuum outlet, 143, the vapor can be directed to the atmosphere or a tank to capture unwanted vapors. The vapors can also be distilled back into a liquid for easier transferring, separation, and storage of the un-desired substance in the pressurized gas flow. Once the desiccant has been regenerated and the vapor removed from the system of FIG. 4, the system is re-pressurized prior to allowing compressed gas back into the system.

Figure 5:
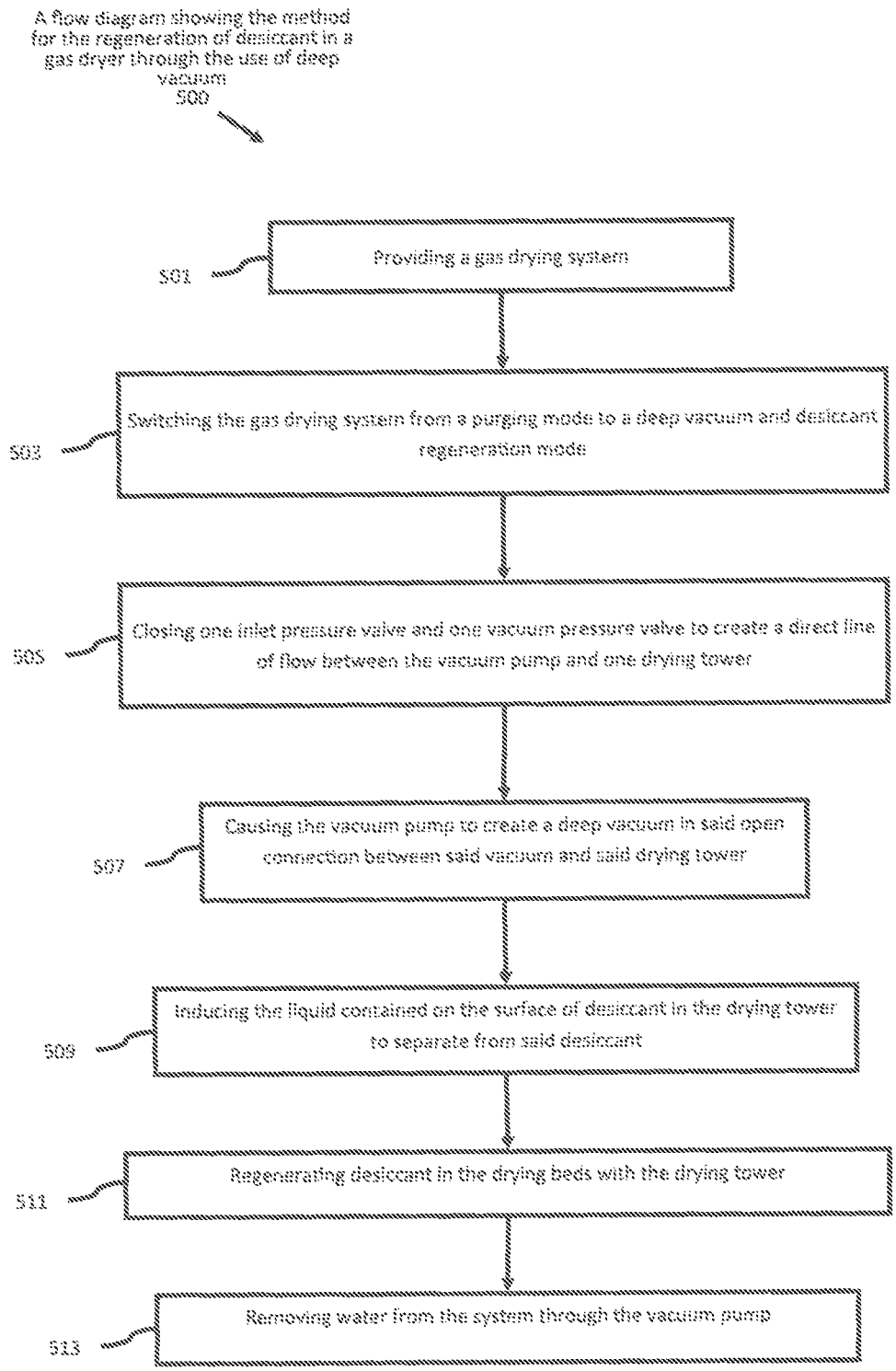
FIG. 5 shows an example flow diagram of the method of regeneration of desiccant.

FIG. 5 provides a flow diagram showing the method for the regeneration of desiccant in a gas dryer through the use of deep vacuum, 500. As shown in FIG. 5, in step 501, a gas drying system is provided (see FIG. 1) with at least two inlet pressure valves, two drying towers, two pressure outlet valves or check valves, two vacuum valves and a vacuum pump attached to the system. In step 503, once all of the compressed gas has been purged and evacuated from a specific tower and sides of the desiccant regeneration system, the desiccant regeneration system is switched into a deep vacuum mode. In step 505, with the switching of the system to a deep vacuum mode, a series of valves are closed to isolate the tower with desiccant to be regenerated. In this example, the inlet pressure valve on the tower to be regenerated is closed along with the vacuum pressure valve corresponding to the opposite tower. This creates a sealed system on the respective side of the system to be regenerated, with a direct line of flow between the vacuum pump and one tower to be regenerated. In step 507, the vacuum pump is initiated and subsequently causes a deep vacuum in lines with the open connection between the vacuum pump and the drying tower, creating a reduced pressure from 20 inHg vacuum to 29.9 inHg vacuum relative to sea level. In another embodiment, a small amount of sweep gas is leaked or pulsed from the tower currently in a drying phase or from the outlet of the system to the tower undergoing regeneration. In step 509, the deep vacuum in the system induces the liquid contained or housed in the desiccant in the drying tower to reach a boiling point, changing phase from a liquid to a vapor, allowing the gas to separate from the desiccant. In step 511, the desiccant, now free of the liquid and under a deep vacuum, is now regenerated. In step 513, the gas under deep vacuum is pulled through the lines and out of the system through the pull or suction of the vacuum pump. In the embodiment where sweep gas is leaked or pulsed into the tower in a regeneration sequence, the sweep gas expands in size and assists in moving the vapor out of the system.

Figure 6:
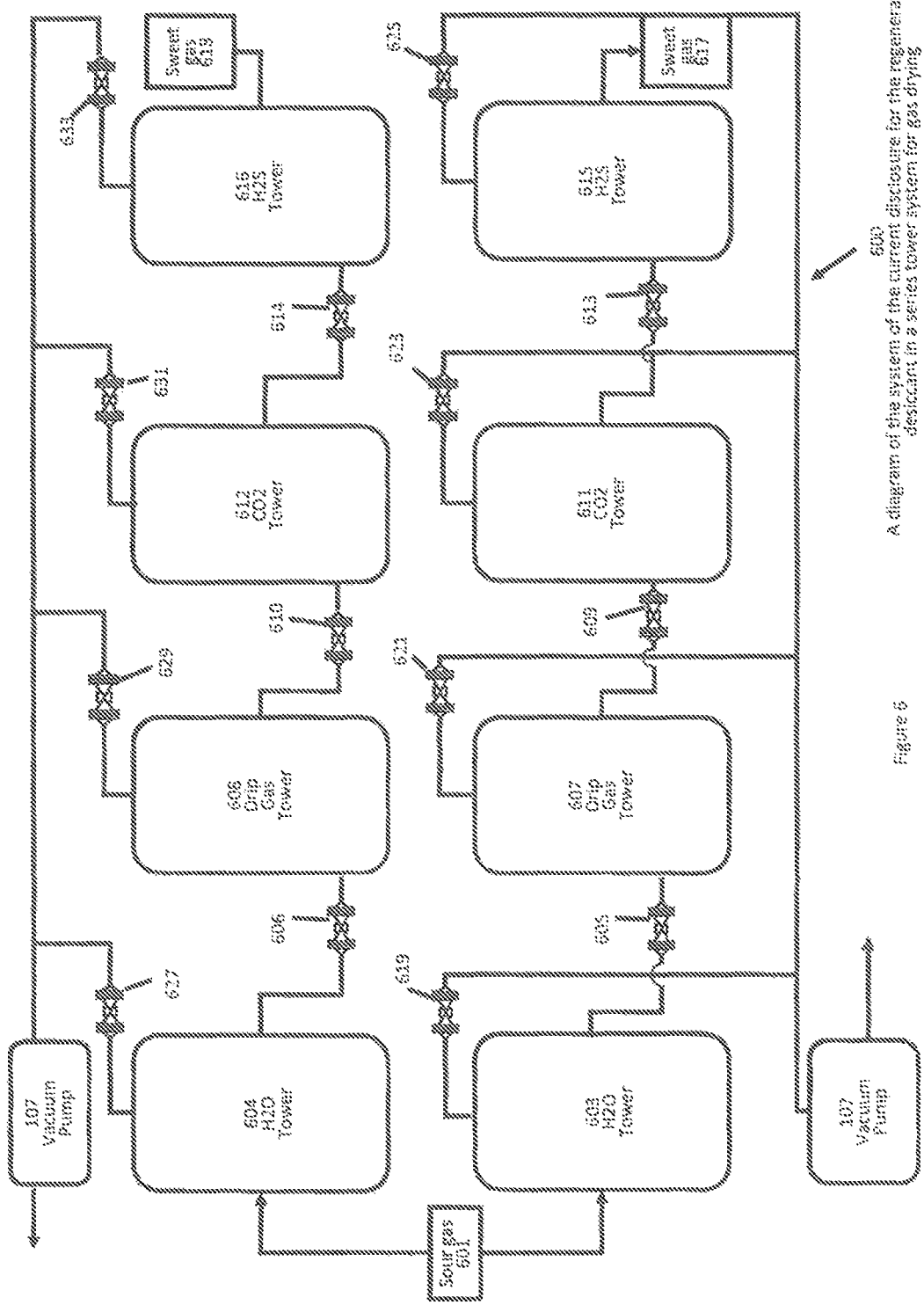
FIG. 6 shows a diagram of the system of the current disclosure for the regeneration of desiccant in a series tower system for gas drying.

In another example, FIG. 6 shows the system and methods of the current disclosure for the regeneration of desiccant in a series tower system for gas drying, 600. As shown in FIG. 6, using various molecular sieves, a mixture of gas is run through a series of four towers (603, 607, 611 and 615), allowing each tower to extract a particular substance from the gas stream. In this example, sour gas, natural gas that contains significant amounts of hydrogen sulfide ($H_2S$) enters into the first vessel or the $H_2O$ tower 603. In the $H_2O$ tower 603, water vapor is removed from the natural gas and stored in molecular sieves. Please note that the towers shown in this example and in FIG. 6 may be placed in different orders or may have additional or fewer towers, depending on gas properties to be separated as will be understood by one skilled in the art.

As the natural gas leaves the $H_2O$ tower 603, due to the adsorption by the molecular sieves, the natural gas is now a dry gas. The natural gas now travels through a flanged valve 605 and into the second vessel or drip tower 607 having a different type of molecular sieve designed to extract drip gas. As it comes out of the drip gas tower 607 vessel, the natural gas would now be dried methane/ethane with $H_2S$ and $CO_2$.

The natural gas now travels through a valve 609 and into the 3rd vessel or the $CO_2$ tower 611 where $CO_2$ is extracted and finally through a final valve 613 and into the 4th vessel or the $H_2S$ vessel 615 where the $H_2S$ is extracted from the natural gas. The final outlet would be cleaned methane/ ethane gas (sweet gas) 617.

Once each tower 603, 607, 611, and 615 has become fully saturated with the respective substances (water, drip gas, $CO_2$ and $H_2S$) that each tower has been adsorbing, the tower would need to switch to an identical set of towers (604, 608, 612 and 616), set opposite to each tower shown. Please note that in this example, the system described herein may also require to blow down and flare the unseparated gas that is stored inside the space in the towers 603, 607, 611, and 615.

For the regeneration of desiccant sequence, each vessel 603, 607, 611, and 615 would be individually isolated, using the opening and closing of vacuum valves (619, 621, 623, 625, 627, 629, 631, and 633) when applying a specific vacuum pressure, to each tower, based on the type of gas.

Each of the components in the sour gas ($H_2O$, drip gas, $CO_2$ and $H_2S$) will separate or be removed from the desiccant or molecular sieve at different pressures and temperatures. For $H_2O$, drip gas and $H_2S$, at a constant temperature, all that is needed to identify the gas that is boiling will be vacuum pressure. The lowest density component will boil at the lowest amount of vacuum. Once all of the substance has boiled off, the next lowest density substance will begin to boil and a vacuum decrease should be noticed.

Figure 7:
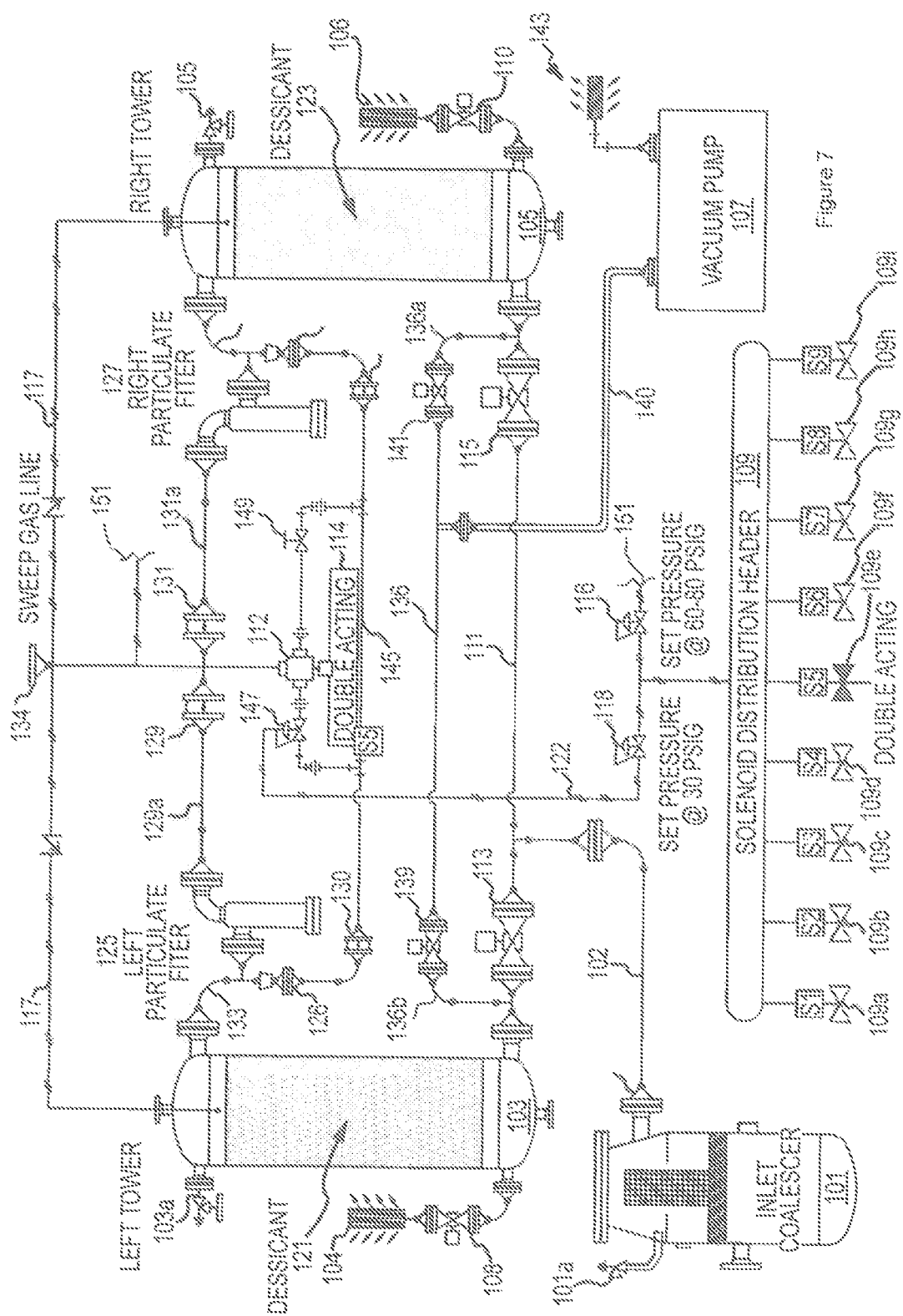
FIG. 7 provides an overall schematic of the desiccant regeneration system of the presentation disclosure.

FIG. 7 provides an overall schematic of the desiccant regeneration system 100 of the present disclosure. As shown in FIG. 7, a two tower 103 and 105 dryer system are shown with both drying towers containing desiccant 121 and 123. An inlet coalescer 101 is operably coupled to the two-tower dryer system 100 by means of an inlet line 102 which is operably coupled to a valve-controlled line 111. In this example an inlet coalescer 101 provides gas to the two towers. The valve-controlled line 111 is operably coupled to two inlet pressure valves 113 and 115 which regulate movement of gas from the inlet line 102 to the drying towers 103 and 105. Flow of gas to a specific tower is determined by the opening or closing of a specific inlet pressure valve 113 and 115. While two inlet pressure valves are shown in FIG. 7, additional inlet pressure valves may be used depending on the number of drying/regeneration towers in a drying and desiccant regeneration system, as will be understood by one skilled in the art, once they understand the scope of the invention. By way of example, three inlet pressure valves may be used in a system with three towers, four inlet pressure valves may be used in a system with four towers, five inlet pressure valves may be used in a system with five towers, six inlet pressure valves may be used in a system with six towers or by example 10 inlet pressure valves may be used in a system with ten towers.

As shown in FIG. 7 each tower 103 and 105 has a tower outlet 104 and 106, coupled to each tower by a tower outlet valve 108 and 110. In the example shown in FIG. 7, a sweep gas line 117, operably coupled between the drying towers 103 and 105 or operably coupled between the system outlet 134 and the drying towers 103 and 105, allows sweep gas to be leaked or pulsed into a tower.

Also shown in FIG. 7, each tower is operably coupled to a tower particulate filter (shown as a left tower particulate filter 125 and a right tower particulate filter 127) by means of an outlet line 133 or 135. In this example, two tower particulate filters are shown, however the number of tower particulate filters will vary with the system specification and requirements, as will be understood by one skilled in the art.

In this example, two lines 129a and 131a operably couples each tower particulate filter (125 and 127) to a positive pressure outlet (shown as two positive pressure outlets 129 and 131) which regulate the release of dried and filtered gas out of the system through the system outlet 134. As will be understood by one skilled in the art, the number of positive pressure outlets (129 and 131) in the system will correspond to the number of towers in the system.

In the system shown in FIG. 7, a solenoid distribution header 109 is shown with nine solenoids (109a, 109b, 109c, 109d, 109e, 109f, 109g, 109h and 109i). In this example, each solenoid corresponds to a valve in the system 100, with each solenoid controlling the opening and closing of a specific valve. While nine solenoids are shown in FIG. 7, any number of solenoids may be used based on the number of valves needed and used in the system, as will be understood by one skilled in the art.

The solenoid distribution header 109 receives inlet pressure which is regulated through a stainless steel pneumatic line 151 operably coupled to the solenoid distribution header 109 and two pressure regulators 116 and 118. The pressure regulators 116 and 118 regulate pressures in the system from 30-100 PSIG, in this example the pressure is set at 60-80 PSIG (pounds/square inch gauge) for the solenoid distribution header 109 and 30 PSIG for controlling the high pressure regulator 147. The main function of the inlet pressure is to actuate the system valves. The pneumatic pressure line 122 is operably coupled to the control bonnet of a high-pressure regulator HPMV 1 (Pressure regulator) 147 which regulates pressure from the double acting valve 112 (operably coupled to another solenoid) to the purge or re-pressurization line 145. The double acting valve 112 is also operably coupled to the purging or re-pressuring line 145, by means of the high-pressure regulator HPMV 1 147 and a control valve 149 used to increase or decrease the rate of re-pressurization. The purging or re-pressuring line 145 is operably coupled to the drying tanks 103 and 105 by means of an outlet line 133 or 135 which is operably coupled to the re-pressuring line 145 by valves 130 and 132 and by flanges 126 and 128. The re-pressuring line 145 provides pressure to the valves and the drying tanks 103 and 105 in the system. By way of example, the drying tower will be at supply pressure, which is around 350 PSIG for this example, and which will also be the same pressure in the inlet coalescer 101 (Note that in purge mode, the pressure in the other tower that is currently purging and regenerating is between 2-8 PSIG). The double acting valve 112 shown in FIG. 7 performs two functions: (1) as a purge supply valve for a heatless regenerative dryer and (2) as a re-pressurization supply valve for switching towers. In this example, the control bonnet of the high pressure regulator HPMV1 147 is fed 30 PSIG from the pressure regulator 118. The double acting valve 112 receives pressurized gas from the discharge of the system 134 around 350 PSIG but up to 500 PSIG and supplies this to the high pressure regulator HPMV1 147 which in turn decreases the pressure to a settable range of approximately 20-180 PSIG for use as purge gas in the purge and re-pressurization line 145. Note that controlling purge gas pressure will control how much purge gas flows through a regenerating tower. Increased flow will regenerate the desiccant faster but will essentially waste more compressed air and therefore waste more energy. For re-pressurization, the double acting valve 112 receives pressured gas from the discharge of the system 134 around 350 PSIG but up to 500 PSIG and supplies this to the control valve 149 which in turn supplies the purge and re-pressurization line 145. The control valve 149 is set to control how fast or slow the re-pressurization occurs. Increasing re-pressurization time will decrease how long re-pressurization takes, but re-pressurizing too fast can damage the desiccant in the tower.

As discussed above, the inlet coalescer 101 is operably coupled to the system 100 by an inlet line 102, allowing compressed gas to enter the drying system. The inlet line 102 is operably coupled to a valve-controlled line 111. The valve-controlled line sends the gas to either the right 105 or left tower 103 in a drying sequence and movement of the gas is controlled by a right 115 or left 113 inlet pressure valves.

Gas travels into either the right 105 or left tower 103 where, in a drying sequence, the desiccant 121 or 123 in the tower 103 and 105 dries the gas. Once dried, the gas leaves the drying tower 103 or 105 and passes through a particulate filter 125 or 127. The dry gas then passes through the right 131 or left 129 positive pressure outlet valves and out of the system 134.

As discussed above, once a tower in the system has completed the drying of a gas, the system may switch that tower into a vacuum or regeneration sequence through the opening or closing of valves to create a closed system by which a vacuum pump 107 operably coupled to the system is able to reduce the pressure in the tower under a regeneration sequence. As shown in FIG. 7, a vacuum pump 107 is operably coupled to the system 100 by means of a vacuum line 140. The vacuum line 140 is operably coupled to a vacuum valve line 136 which is operably coupled to two vacuum valves 139 and 141 individually associated with a drying tower. Each vacuum valve 139 and 141 is operably coupled to the right or left tower by a vacuum inlet line 136a or 136b.

In a regeneration sequence for the system of the present disclosure, a series of valves are closed, depending on the size and number of towers in a system. In this example one inlet pressure valve 113 or 115 is closed along with one vacuum valve 139 or 141 and one positive pressure outlet valve 129 or 131, while one vacuum valve 139 or 141 is opened to create a pathway from the vacuum pump 107 to the tower 103 or 105 in question, creating a closed system from the vacuum pump to either the right or left tower. While two vacuum valves 139 and 141 are shown, any number of vacuum valves may be used based on the number of towers in the system, as will be understood by one skilled in the art.

As discussed above, once the vacuum pump has been turned on, the pump creates a deep vacuum in the system, which creates a drop in the required temperature for the phase change point of the liquid, inducing liquid within the desiccant in a tower to reach a boiling point, causing the liquid to undergo a phase change to a vapor and the gas will start flowing out of the system, through the vacuum outlet 143 due to a pressure drop across the system.

As shown in FIG. 7, weld locations are indicated with a black dot on each line connection. As discussed above, the entire system was designed to limit potential vacuum leaks. All piping that sees deep vacuum should be welded with flanges and gaskets or additional sealing methods to prevent leaks, as will be understood by one skilled in the art. Plug style valves may be used to minimize leaks.

In another embodiment of the present disclosure, each dryer tower may contain one or more flow distribution screens in the shape of a cone, placed at the top and bottom of each tower. Each cone is perforated to allow the air to be diffused. The use of the one or more cones provides structural support for the desiccant in each dryer tower as well as providing a precise amount of space for the desiccant volume. The bottom cone supports the weight of the desiccant while the top cone is used to block big particles from escaping the tower. The use of the cones allows the gas to expand in the bottom chamber of the drying tower, below the desiccant. As the air expands to the diameter of the vessel, it distributes the velocity profile so it is more uniform and slows the velocity of the air to allow more contact time with the desiccant. This allows for improved and more efficient adsorption due to a more uniform flow profile and slower flow velocity. Note that too slow of a velocity may decrease efficiency because some turbulence is desirable. There is a balance between velocity and contact time, as will be understood by one skilled in the art.

In another embodiment, a sweep gas system may be included. In this embodiment, dry process gas (instrument gas) is added to the top of the regeneration vessel or tower to create a counter flow regeneration direction compared to drying direction. This small amount of gas will cause the pressure to slightly increase (approximately 2-5 inHg), allowing the de-adsorbed vapor to be transferred out of the system due to a pressure differential.

EXAMPLES

The following examples are provided to illustrate further the various applications and are not intended to limit the invention beyond the limitations set forth in the appended claims.

The following examples were conducted using a two-tower drying system over a three to four-hour period of time with each tower cycling between a drying sequence and a regeneration sequence. Each tower in the system contained aluminum oxide desiccant and with each tower rated to 500 psi. The two-tower drying system was operably coupled to a Quincy QSV 530 high water capacity vacuum pump with a 20 horsepower (hp) drive. Readings were taken in Casper, Wyo. at an approximate elevation of 5340', with an ambient temperature of approximately 22° F. at 95% humidity. Data was collected two minutes after the towers switched sequences and the dew point was collected 80 seconds prior to the switching of towers in a cycle.

As shown in Examples 1-5, the dew point in the two-tower system was maintained or reduced, indicating that the vacuum regeneration system was removing at least the same amount or more than the amount of water that was being introduced into the system and the desiccant with every drying/regeneration cycle.

Example 1

Table 1 shows an example of desiccant regeneration performance in a two-tower drying system of the present disclosure. As shown in Table 1, the first column indicates the drying cycle tower in a regeneration sequence (left (L) or right (R)), the vacuum pressure in the tower in a regeneration sequence (in pounds per square inch absolute (PSIG_abs)), the drying tower pressure (PSIG), the sweep gas flow (shown in standard cubic feet per minute (SCFM)) from the drying tower to the regeneration tower, the inlet temperature (F) of the system, the outlet temperature (F) of the system, the desiccant temperature (F) in the drying tower, pressure dew point (F) at the exit of the system after the drying tower, as well as the process air flow rate (SCFM) through the drying tower side of the system. In columns two through seven, the tower in regeneration is shown, with a twelve (12) minute regeneration cycle before switching towers. The vacuum pressure induced in a particular tower is shown in row two and the sweep gas flow into a tower in regeneration is shown in row four and the resulting pressure dew point at the exit of the system after the drying tower is shown in row eight.

As shown in Table 1, the dew point at the exit of the system was between −20.8° F. and −25.5° F. at the time of switching from a drying tower to a regeneration tower. The vacuum pressure in the regeneration tower ranged from −10.4 PSIG to −10.9 PSIG, with a desiccant temperature between 86° F. and 89° F. The sweep gas flow in this example ranged from 21.0 SCFM to 27.2 SCFM. The process air flow rate in the system in this example was between 1802 and 1817 SCFM.

Please note that the dew point of the process air (wet air) that is entering the dryer system will be equal to the inlet temperature, because the incoming process air is 100% saturated with water vapor. For example, Table 1 column 2 shows that the wet process air entering the dryer system will have a pressure dew point of 96° F., and the right tower that is drying the air (while the left tower is regenerating) is reducing the dew point of the process air to −20.8° F.

As shown in Table 1, the dew point in the system during regeneration of desiccant in the left tower, measuring the actual dew point of the dried process air downstream of the right tower, was reduced by −3.2° F. over a 60-minute period, while the dew point in the system during regeneration of desiccant in the right tower, measuring the actual dew point of the dried process air downstream of the left tower, was reduced by −0.1° F., over a 60-minute period.

TABLE 1

| | Drying Cycle Tower (L/R) | | | | | |
|---|---|---|---|---|---|---|
| | L (12 min) | R (12 min) | L (12 min) | R (12 min) | L (12 min) | R (12 min) |
| Vacuum Pressure (PSIG_abs) | −10.7 | −10.9 | −10.7 | −10.4 | −10.5 | −10.5 |
| Drying Tower Pressure (PSIG) | 248 | 258 | 255 | 253 | 255 | 256 |
| Sweep Gas Flow (SCFM) | 22.3 | 22.7 | 22.5 | 21.0 | 27.1 | 27.2 |
| Inlet Temp (F.) | 96 | 97 | 99 | 98 | 99 | 97 |
| Outlet Temp (F.) | 80 | 81.6 | 88 | 84 | 88 | 87 |
| Desiccant Temp (F.) | 86 | 86 | 86 | 86 | 89 | 87 |
| Pressure Dew Point (F.) | −20.8 | −24.8 | −24 | −25.5 | Data not collected | −24.9 |
| Process Air Flow Rate (SCFM) | 1802 | 1813 | 1803 | 1811 | 1817 | 1817 |

Example 2

Table 2 shows an example of desiccant regeneration performance in a two-tower drying system of the present disclosure. As shown in Table 2, the first column indicates the drying cycle tower in a regeneration sequence, the vacuum pressure in the tower in a regeneration sequence (in pounds per square inch absolute (PSIG_abs)), the drying tower pressure (PSIG), the sweep gas flow (shown in standard cubic feet per minute (SCFM)) from the drying tower to the regeneration tower, the inlet temperature (F) of the system, the outlet temperature (F) of the system, the desiccant temperature (F) in the system, pressure dew point (F) at the exit of the system, as well as the process air flow rate (SCFM) in the system. In columns two through six, the tower in regeneration is shown, with a twelve (12) minute regeneration cycle before switching towers. The vacuum pressure induced in a particular tower is shown in row two and the sweep gas flow into a tower in regeneration is shown in row four and the resulting pressure dew point at the exit or outlet of the system is shown in row eight.

As shown in Table 2, the dew point at the exit of the system ranged from −22.8° F. and −28.3° F. at the time of switching from a drying tower to a regeneration tower. The vacuum pressure in the regeneration tower ranged from −10.4 PSIG to −10.6 PSIG, with a desiccant temperature between 86° F. and 90° F. The sweep gas flow from the drying tower to the regeneration tower was between 26.9 SCFM to 27.2 SCFM. The process flow air flow rate in this example was between 1807 and 1817 SCFM.

As shown in Table 2, the dew point in the system during regeneration of desiccant in the left tower, measuring the actual dew point of the dried process air downstream of the right tower, was reduced by −4.4° F. from the original measure in Table 1, while the dew point in the system during regeneration of desiccant in the right tower, measuring the actual dew point of the dried process air downstream of the left tower, was reduced by −3.5° F., from the original measurement in Table 1.

TABLE 2

| Drying Cycle Tower (L/R) | L (12 min) | R (12 min) | L (12 min) | R (12 min) | L (12 min) |
|---|---|---|---|---|---|
| Vacuum Pressure (PSIG abs) | −10.5 | −10.5 | −10.5 | −10.6 | −10.4 |
| Drying Tower Pressure (PSIG) | 256 | 254 | 257 | 255 | 251 |
| Sweep Gas Flow (SCFM) | 27.2 | 27.0 | 27.2 | 27.1 | 26.9 |
| Inlet Temp (F) | 97 | 98 | 98 | 97 | 97 |
| Outlet Temp (F) | 89 | 87 | 90 | 88 | 89 |
| Desiccant Temp (F) | 86 | 86 | 88 | 88 | 90 |
| Pressure Dew Point (F) | −22.8 | −26.5 | −23.7 | −28.3 | −25.2 |
| Process Air Flow Rate (SCFM) | 1817 | 1817 | 1817 | 1807 | 1807 |

Example 3

Table 3 shows another example of desiccant regeneration performance in a two-tower drying system of the present disclosure. As shown in Table 3, the first column indicates the drying cycle tower in a regeneration sequence, the vacuum pressure in the tower in a regeneration sequence (in pounds per square inch absolute (PSIG_abs)), the drying tower pressure (PSIG), the sweep gas flow (shown in standard cubic feet per minute (SCFM)) from the drying tower to the regeneration tower, the inlet temperature (F) of the system, the outlet temperature (F) of the system, the desiccant temperature (F) in the drying tower, pressure dew point (F) at the exit of the system after the drying tower, as well as the process air flow rate (SCFM) through the drying tower side of the system. In columns two through seven, the tower in regeneration is shown, with a ten (10) minute regeneration cycle before switching towers. The vacuum pressure induced in a particular tower is shown in row two and the sweep gas flow into a tower in regeneration is shown in row four and the resulting pressure dew point at the exit of the system after the drying tower is shown in row eight.

As shown in Table 3, the dew point at the exit of the system was between −28° F. and −31.2° F. at the time of switching from a drying tower to a regeneration tower. The vacuum pressure in the regeneration tower ranged between −10.2 PSIG and −10.5 PSIG, with a desiccant temperature between 90° F. and 92° F. The sweep gas flow in this example was from 27.1 SCFM to 31.6 SCFM. The process flow air flow rate in this example was between 1807 and 1812 SCFM.

As shown in Table 3, the dew point in the system during regeneration of desiccant in the left tower, measuring the actual dew point of the dried process air downstream of the right tower, was reduced by −7.4° F. from the original measure in Table 1, while the dew point in the system during regeneration of desiccant in the right tower, measuring the actual dew point of the dried process air downstream of the left tower, was reduced by −6.4° F., from the original measurement in Table 1.

TABLE 3

| | Drying Cycle Tower (L/R) | | | | | |
|---|---|---|---|---|---|---|
| | R (10 min) | L (10 min) | R (10 min) | L (10 min) | R (10 min) | L (10 min) |
| Vacuum Pressure (PSIG_abs) | −10.5 | −10.2 | −10.4 | −10.2 | −10.4 | −10.2 |
| Drying Tower Pressure (PSIG) | 255 | 254 | 255 | 250 | 253 | 254 |
| Sweep Gas Flow (SCFM) | 27.1 | 30.0 | 31.6 | 31.1 | 31.4 | 31.5 |
| Inlet Temp (F.) | 98 | 98 | 98 | 99 | 100 | 100 |
| Outlet Temp (F.) | 91 | 91 | 90 | 92 | 92 | 93 |
| Desiccant Temp (F.) | 90 | 90 | 90 | 91.2 | 90 | 92 |
| Pressure Dew Point (F.) | −30.5 | −28 | −31 | −28.2 | −31.2 | −28.2 |
| Process Air Flow Rate (SCFM) | 1807 | 1810 | 1812 | 1811 | 1811 | 1811 |

Example 4

Table 4 shows another example of desiccant regeneration performance in a two-tower drying system of the present disclosure. As shown in Table 4, the first column indicates the drying cycle tower in a regeneration sequence (left (L) or right (R)), the vacuum pressure in the tower in a regeneration sequence (in pounds per square inch absolute (PSIG_abs)), the drying tower pressure (PSIG), the sweep gas flow (shown in standard cubic feet per minute (SCFM)) from the drying tower to the regeneration tower, the inlet temperature (F) of the system, the desiccant temperature (F) in the drying tower, and pressure dew point (F) at the exit of the system after the drying tower. In columns two through four, the tower in regeneration is shown, with a ten (10) minute regeneration cycle before switching towers. The vacuum pressure induced in a particular tower is shown in row two and the sweep gas flow into a tower in regeneration is shown in row four and the resulting pressure dew point at the exit of the system after the drying tower shown in row seven.

Please note that in this example, a discharge valve (downstream of the exit of the system) was closed to arrest air flow while maintaining pressure. Process air was not flowing through the drying side of the system (because the discharge valve was shut) except for approximately 1 to 2 SCFM that was passing through the dew point meter plus the sweep gas flow from the drying tower to the regenerating tower. However, the regeneration of desiccant by use of the vacuum continued to cycle between towers. Since the dewpoint decreased more rapidly, this shows that the vacuum regeneration was able to remove even more water from the desiccant.

As shown in Table 4, the dew point at the exit of the system was between −40.5° F. and −53.5° F. at the time of switching of the sequence between towers. The vacuum pressure ranged between −9.4 PSIG and −10 PSIG, with a sweep gas flow between the drying tower and the regeneration tower of 28.4 SCFM to 46.7 SCFM.

As shown in Table 4, the dew point in the system during regeneration of desiccant in the left tower, measuring the actual dew point of the dried process air (1 to 2 SCFM in this example) downstream of the right tower, was reduced by −27.2° F. from the original measure in Table 1, while the dew point in the system during regeneration of desiccant in the right tower, measuring the actual dew point of the dried process air (1 to 2 SCFM in this example) downstream of the left tower, was reduced by −28.7° F., from the original measurement in Table 1.

TABLE 4

| Drying Cycle Tower (L/R) | R (10 min) | L (10 min) | R (10 min) |
|---|---|---|---|
| Vacuum Pressure (PSIG abs) | −9.4 | −10 | −9.6 |
| Drying Tower Pressure (PSIG) | 400 | 400 | 400 |
| Sweep Gas Flow (SCFM) | 46.7 | 41.2 | 28.4 |
| Inlet Temp (F) | 99 | 95 | 84 |
| Desiccant Temp (F) | 92 | Data not collected | Data not collected |
| Pressure Dew Point (F) | −40.5 | −48 | −53.5 |

Example 5

Table 5 shows another example of desiccant regeneration performance in a two-tower drying system of the present disclosure. As shown in Table 5 the first column indicates the drying cycle tower in a regeneration sequence, the vacuum pressure in the tower in a regeneration sequence (in pounds per square inch absolute (PSIG_abs)), the drying tower pressure (PSIG), the sweep gas flow (shown in standard cubic feet per minute (SCFM)) from the drying tower to the regeneration tower, the inlet temperature (F) of the system, the desiccant temperature (F) in the drying tower, pressure dew point (F) at the exit of the system after the drying tower, and process air flow rate (SCFM) through the drying tower side of the system. In columns two and three, the tower in regeneration is shown, with a ten (10) minute regeneration cycle before switching towers. Please note that in this example, the main process flow was re-established after the regeneration cycling in Example 4. The overall dewpoint coming out of the system remained lower than the tests before the discharge valve was shut, because extra water was removed from the desiccant during the period when only regeneration was taking place and little to no process flow drying was occurring.

As shown in Table 5, the dew point at the exit of the system was between −38.1° F. and −40.2° F. at the time of switching from a drying tower to a regeneration tower. The vacuum pressure ranged between −10.4 PSIG and −10.3 PSIG, with a desiccant temperature between 80° F. and 81° F. The sweep gas flow in this example was between 29.7 SCFM to 30.0 SCFM.

As shown in Table 5, the dew point in the system during regeneration of desiccant in the left tower, measuring the actual dew point of the dried process air downstream of the right tower, was reduced by −19.4° F. from the original measure in Table 1, while the dew point in the system during regeneration of desiccant in the right tower, measuring the actual dew point of the dried process air downstream of the left tower, was reduced by −13.3° F., from the original measurement in Table 1.

TABLE 5

| Drying Cycle Tower (L/R) | R (10 min) | L (10 min) |
|---|---|---|
| Vacuum Pressure (PSIG abs) | −10.4 | −10.3 |
| Drying Tower Pressure (PSIG) | 250 | 248 |
| Sweep Gas Flow (SCFM) | 30.0 | 29.7 |
| Inlet Temp (F) | 92 | 96 |
| Desiccant Temp (F) | 80 | 81 |
| Pressure Dew Point (F) | −38.1 | −40.2 |
| Process Air Flow Rate (SCFM) | 1810 | 1810 |

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A system for regeneration of desiccant in a compressed gas drying tower, the system comprising:
   at least one first drying tower and at least one second drying tower, where each of the at least one first drying tower and at least one second drying tower contain desiccant for the removal of liquid from compressed gas;
   at least one first inlet pressure valve and at least one second inlet pressure valve, where the at least one first drying tower is operably connected to the first inlet pressure valve, and where the at least one first inlet pressure valve regulates the movement of compressed gas from the inlet pressure valve to the at least one first drying tower; and
   where the at least one second drying tower is operably connected to the second inlet pressure valve, and where the at least one second inlet pressure valve regulates the movement of compressed gas from the inlet valve to the at least one second drying tower;
   at least one first pressure outlet valve, and at least one second pressure outlet valve;
   where the at least one first pressure outlet valve regulates the movement of compressed gas out of the at least one first drying tower and out of the system; and
   where the at least one second pressure outlet valve regulates the movement of compressed gas out of the at least one second drying tower and out of the system;
   at least one vacuum pump, where the vacuum pump is operably coupled to the at least one first drying tower and operably couple to the at least one second drying tower; and
   at least one first vacuum pressure valve operably coupled to the at least one first drying tower and the vacuum; and
   at least one second vacuum pressure valve is operably coupled to the at least one second drying tower and the vacuum;
   where the at least one first vacuum pressure valve controls the pressure between the vacuum and the first drying tower; and
   where the at least one second vacuum pressure valve controls the pressure between the vacuum and the second drying tower.

2. The system of claim 1, wherein said system is capable of initiating a regeneration sequence of desiccant through the isolation of either said at least one first drying tower and at least one second drying tower;
   wherein said isolation of said at least one first drying tower and at least one second drying tower is through the closing of individual valves in said system, wherein said individual valves are chosen from:
   said at least one first inlet pressure valve and said at least one second inlet pressure valve;
   said at least one first pressure outlet valve and said at least one second pressure outlet valve; and
   said at least one first vacuum pressure valve and said at least one second vacuum pressure valve.

3. The system of claim 2, wherein said system is capable of switching said at least one first drying tower and at least one second drying tower between a drying sequence and said regeneration sequence.

4. The system of claim 1, further comprising a sweep gas line:
   wherein said sweep gas line operably connects the at least one first drying tower and at least one second drying tower or a system outlet; and
   wherein said sweep gas line allows sweep gas to leak from at least one drying tower in a sequence of drying compressed gas into the at least one first drying tower or the at least one second drying tower when one tower is in a sequence of regeneration of desiccant.

5. The system of claim 4, wherein said sweep gas line allows for sweep gas to be pulsed into said the at least one first drying tower or the at least one second drying tower when one tower is in a sequence of regeneration of desiccant.

6. The system of claim 1, wherein said desiccant is a desiccant chosen from aluminum oxide, aluminum hydroxide, activated alumina, silica, silica gel, indicating silica gel, silica dioxide, charcoal, activated charcoal, activated carbon, calcium sulfate, calcium chloride, calcium oxide, magnesium aluminum silicate, clay, montmorillonite clay, and molecular sieves.

7. The system of claim 1, wherein said system reduces the pressure in said at least one first drying tower or the at least one second drying tower in a sequence of regeneration of desiccant from 20 inHg vacuum to 29.9 inHg vacuum relative to sea level.

8. The system of claim 7, wherein said pressure in said at least one first drying tower or the at least one second drying tower in a sequence of regeneration of desiccant is reduced to between 28 and 29.9 inHg vacuum relative to sea level.

9. The system of claim 1, wherein said system is re-pressurized after the completion of the regeneration of desiccant.

10. The system of claim 1, wherein said system is capable of drying a mixture of gases.

11. The system of claim 1, wherein said system is capable of drying a gas by removing constituents from said gas wherein said constituents are chosen from water, drip gas, $CO_2$ and $H_2S$.

12. The system of claim 1, wherein said compressed gas is chosen from air, natural gas, acetylene, alkanes, alkenes, alkynes, cycloalkanes, alkadienes, oxygen, nitrogen, chlorine, fluorine, hydrogen, helium, neon, argon, krypton, nitrogen, xenon, and radon.

13. A method for regeneration of desiccant in a compressed gas drying tower, the method comprising:
 providing a desiccant regeneration system comprising;
 providing at least one first drying tower and at least one second drying tower, where each of the at least one first drying tower and at least one second drying tower contain desiccant for the removal of water or other substance from compressed gas;
 providing at least one first pressure inlet valve and at least one second pressure inlet valve; where the at least one first drying tower is operably connected to the inlet valve, and where the at least one first pressure inlet valve regulates the movement of compressed gas from the inlet valve to the at least one first drying tower; and
 wherein the at least one second drying tower is operably connected to the inlet valve, and where the at least one second pressure inlet valve regulates the movement of compressed gas from the inlet valve to the at least one second drying tower;
 providing at least one first pressure outlet valve, and at least one second pressure outlet valve;
 wherein at least one first pressure outlet valve regulates the movement of compressed gas out of the at least one first drying tower and out of the system; and
 wherein the at least one second pressure outlet valve regulates the movement of compressed gas out of the at least one first drying tower and out of the system;
 providing a vacuum pump, wherein the vacuum is operably coupled to the at least one first drying tower and operably coupled to the at least one second drying tower; and
 providing at least one first vacuum pressure valve operably coupled to the at least one first drying tower and the vacuum; and
 providing at least one second vacuum pressure valve operably coupled to the at least one second drying tower and the vacuum;
 wherein the at least one first vacuum pressure valve controls the pressure between the vacuum and the first drying tower; and where the at least one second vacuum pressure valve controls the pressure between the vacuum and the second drying tower, creating a single open connection between the vacuum pump and one of the drying towers by closing the first pressure inlet valve or the second pressure inlet valve;
 initiating a regeneration sequence in either said at least one first drying tower or said at least one second drying tower by closing at least either the first vacuum valve or the second vacuum valve to match the closure of either the first pressure outlet valve or the second pressure outlet valve;
 causing the vacuum pump to create a deep vacuum in the open connection between the vacuum and the tower in a regeneration sequence; and
 inducing liquid within and around the desiccant in said tower in a regeneration sequence to be removed from said desiccant by changing to a gaseous state;
 wherein the gas is removed from the system through the vacuum outlet; and
 wherein the desiccant is regenerated within the drying tower in a regeneration sequence.

14. The method of claim 13, wherein said desiccant regeneration system is capable of initiating a regeneration sequence through the isolation of either said at least one first drying tower and at least one second drying tower;
 wherein said isolation of said at least one first drying tower and at least one second drying tower is through the closing of individual valves in said system, wherein said individual valves are chosen from:
 said at least one first inlet pressure valve and said at least one second inlet pressure valve;
 said at least one first pressure outlet valve and said at least one second pressure outlet valve; and
 said at least one first vacuum pressure valve and said at least one second vacuum pressure valve.

15. The method of claim 13, wherein said desiccant regeneration system is capable of switching said at least one first drying tower and at least one second drying tower between a drying sequence and said regeneration sequence on a particular tower, the method of switching said towers from said drying sequence to said regeneration sequence comprising:
 opening any closed valves chosen from:
 said at least one first inlet pressure valve and said at least one second inlet pressure valve;
 said at least one first pressure outlet valve and said at least one second pressure outlet valve; and
 said at least one first vacuum pressure valve and said at least one second vacuum pressure valve; and
 closing any open valves chosen from:
 said at least one first inlet pressure valve and said at least one second inlet pressure valve;
 said at least one first pressure outlet valve and said at least one second pressure outlet valve; and
 said at least one first vacuum pressure valve and said at least one second vacuum pressure valve;
 wherein said opening and closing of said valves creates an isolated system for a regeneration sequence in said at least one first drying tower or said at least one second drying tower while allowing said at least one other tower to be in a drying sequence.

16. The method of claim 15, wherein said desiccant regeneration system is re-pressurized after a regeneration sequence has been completed.

17. The method of claim 13, wherein said method further comprises providing a sweep gas line:
 wherein said sweep gas line operably connects the at least one first drying tower or a system outlet and at least one second drying tower in a regeneration sequence; and
 providing sweep gas;
 allowing said sweep gas to travel through said sweep gas line from at least one drying tower in a sequence of drying compressed gas or the system outlet and leak into the at least one first drying tower or the at least one second drying tower when one tower is in a sequence of regeneration of desiccant.

18. The method of claim 17, wherein said sweep gas line allows for sweep gas to be pulsed to said into the at least one first drying tower or the at least one second drying tower when one tower is in a sequence of regeneration of desiccant.

19. The method of claim 13, where said desiccant is a desiccant chosen from aluminum oxide, aluminum hydroxide, activated alumina, silica, silica gel, indicating silica gel, silica dioxide, charcoal, activated charcoal, activated carbon, calcium sulfate, calcium chloride, calcium oxide, magnesium aluminum silicate, clay, montmorillonite clay, molecular sieves, and other adsorbents.

20. The method of claim 13, wherein the pressure in said at least one first drying tower or the at least one second drying tower in a sequence of regeneration of desiccant is reduced to between 20 inHg vacuum and 29.9 inHg vacuum relative to sea level.

21. The method of claim 20, wherein said pressure in said at least one first drying tower or the at least one second drying tower in a sequence of regeneration of desiccant is reduced to between 28 and 29.9 inHg vacuum relative to sea level.

22. The method of claim 13, wherein the method further comprises re-pressurizing the system after the completion of the regeneration of desiccant.

23. The method of claim 13, wherein the method further comprises drying a mixture of gases.

24. The method of claim 13, wherein said system is capable of drying a gas by removing constituents from said gas, wherein said constituents are chosen from water, drip gas, $CO_2$ and $H_2S$.

25. The method of claim 23, wherein said mixture of gases is chosen from air, natural gas, propane, methane, butane, pentane, acetylene as well as other forms of alkanes, alkenes, alkynes, cycloalkanes, and alkadienes, oxygen, nitrogen, chlorine, fluorine, hydrogen, helium, neon, argon, krypton, nitrogen, xenon, and radon.

26. The system of claim 1, wherein said system further comprises an inlet coalescer.

27. The system of claim 1, wherein said system further comprises a solenoid distribution header operably coupled to one or more solenoids, wherein said one or more solenoids control the opening and closing of said valves.

28. The method of claim 13, wherein said method further comprises providing an inlet coalescer, wherein said inlet coalescer regulates the input of compresses gases into the system.

29. The method of claim 13, wherein said method further comprises providing a solenoid distribution header operably coupled to one or more solenoids, wherein said one or more solenoids control the opening and closing of said valves.

30. The system of claim 7, wherein said pressure in said at least one first drying tower or the at least one second drying tower in a sequence of regeneration of desiccant is reduced to between about 20.0 and 20.9 inHg vacuum relative to sea level.

31. The system of claim 7, wherein said pressure in said at least one first drying tower or the at least one second drying tower in a sequence of regeneration of desiccant is reduced to between about 21.0 and 21.9 inHg vacuum relative to sea level.

32. The system of claim 7, wherein said pressure in said at least one first drying tower or the at least one second drying tower in a sequence of regeneration of desiccant is reduced to between about 22.0 and 22.9 inHg vacuum relative to sea level.

33. The system of claim 7, wherein said pressure in said at least one first drying tower or the at least one second drying tower in a sequence of regeneration of desiccant is reduced to between about 23.0 and 23.9 inHg vacuum relative to sea level.

34. The system of claim 7, wherein said pressure in said at least one first drying tower or the at least one second drying tower in a sequence of regeneration of desiccant is reduced to between about 24.0 and 24.9 inHg vacuum relative to sea level.

35. The system of claim 7, wherein said pressure in said at least one first drying tower or the at least one second drying tower in a sequence of regeneration of desiccant is reduced to between about 25.0 and 25.9 inHg vacuum relative to sea level.

36. The system of claim 7, wherein said pressure in said at least one first drying tower or the at least one second drying tower in a sequence of regeneration of desiccant is reduced to between about 26.0 and 26.9 inHg vacuum relative to sea level.

37. The system of claim 7, wherein said pressure in said at least one first drying tower or the at least one second drying tower in a sequence of regeneration of desiccant is reduced to between about 27.0 and 27.9 inHg vacuum relative to sea level.

38. The system of claim 7, wherein said pressure in said at least one first drying tower or the at least one second drying tower in a sequence of regeneration of desiccant is reduced to between about 28.0 and 28.9 inHg vacuum relative to sea level.

39. The system of claim 7, wherein said pressure in said at least one first drying tower or the at least one second drying tower in a sequence of regeneration of desiccant is reduced to between about 29.0 and 29.9 inHg vacuum relative to sea level.

40. The method of claim 20, wherein said pressure in said at least one first drying tower or the at least one second drying tower in a sequence of regeneration of desiccant is reduced to between about 20.0 and 20.9 inHg vacuum relative to sea level.

41. The method of claim 20, wherein said pressure in said at least one first drying tower or the at least one second drying tower in a sequence of regeneration of desiccant is reduced to between about 21.0 and 21.9 inHg vacuum relative to sea level.

42. The method of claim 20, wherein said pressure in said at least one first drying tower or the at least one second drying tower in a sequence of regeneration of desiccant is reduced to between about 22.0 and 22.9 inHg vacuum relative to sea level.

43. The method of claim 20, wherein said pressure in said at least one first drying tower or the at least one second drying tower in a sequence of regeneration of desiccant is reduced to between about 23.0 and 23.9 inHg vacuum relative to sea level.

44. The method of claim 20, wherein said pressure in said at least one first drying tower or the at least one second drying tower in a sequence of regeneration of desiccant is reduced to between about 24.0 and 24.9 inHg vacuum relative to sea level.

45. The method of claim 20, wherein said pressure in said at least one first drying tower or the at least one second drying tower in a sequence of regeneration of desiccant is reduced to between about 25.0 and 25.9 inHg vacuum relative to sea level.

46. The method of claim 20, wherein said pressure in said at least one first drying tower or the at least one second drying tower in a sequence of regeneration of desiccant is reduced to between about 26.0 and 26.9 inHg vacuum relative to sea level.

47. The method of claim 20, wherein said pressure in said at least one first drying tower or the at least one second drying tower in a sequence of regeneration of desiccant is reduced to between about 27.0 and 27.9 inHg vacuum relative to sea level.

48. The method of claim 20, wherein said pressure in said at least one first drying tower or the at least one second drying tower in a sequence of regeneration of desiccant is reduced to between about 28.0 and 28.9 inHg vacuum relative to sea level.

49. The method of claim 20, wherein said pressure in said at least one first drying tower or the at least one second drying tower in a sequence of regeneration of desiccant is reduced to between about 29.0 and 29.9 inHg vacuum relative to sea level.

* * * * *